(12) United States Patent
Imagawa et al.

(10) Patent No.: US 9,304,281 B2
(45) Date of Patent: Apr. 5, 2016

(54) LENS DEVICE AND IMAGING APPARATUS

(71) Applicant: FUJIFILM CORPORATION, Tokyo (JP)

(72) Inventors: Kentaro Imagawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 49 days.

(21) Appl. No.: 14/448,016

(22) Filed: Jul. 31, 2014

(65) Prior Publication Data

US 2014/0340776 A1 Nov. 20, 2014

Related U.S. Application Data

(63) Continuation of application No. PCT/JP2012/079404, filed on Nov. 13, 2012.

(30) Foreign Application Priority Data

Jan. 31, 2012 (JP) ................................. 2012-019051

(51) Int. Cl.
*G02B 7/02* (2006.01)
*G02B 15/14* (2006.01)
(Continued)

(52) U.S. Cl.
CPC *G02B 7/04* (2013.01); *G02B 7/022* (2013.01); *G02B 7/10* (2013.01); *G02B 7/102* (2013.01);
(Continued)

(58) Field of Classification Search
CPC .......... G02B 7/00; G02B 7/022; G02B 7/026; G02B 7/04; G02B 7/08; G02B 7/10; G02B 7/102; G02B 7/282; G02B 15/14; G03B 3/00; G03B 3/10; G03B 5/00; G03B 13/00; G03B 17/04; G03B 17/20; G03B 17/568; G03B 2205/00; G03B 2205/0053; H04N 5/23212
USPC .............. 359/694–704, 823, 825; 396/72–75, 396/82–85, 89; 348/347, 349
See application file for complete search history.

(56) References Cited

U.S. PATENT DOCUMENTS 7,444,074 B2 * 10/2008 Shibasaki ...................... 396/121
7,962,028 B2 * 6/2011 Yamamoto ...................... 396/80

FOREIGN PATENT DOCUMENTS

JP 50-47439 5/1975
JP 64-34608 3/1989
(Continued)

OTHER PUBLICATIONS

International Search Report—PCT/JP2012/079404—Jan. 22, 2013.

*Primary Examiner* — Loha Ben
(74) *Attorney, Agent, or Firm* — Young & Thompson

(57) ABSTRACT

A lens device, includes: a lens barrel including an operation ring provided to be rotatable about an optical axis; a drive unit including a drive part configured to rotatably drive the operation ring, the drive unit being detachably fixed to a predetermined portion on an outer circumference of the lens barrel, in which the drive unit moves in relation to the lens barrel in a direction of the optical axis to be attached to or detached from the lens barrel, and the operation ring and the drive unit are respectively provided with engaging parts, wherein, when the operation ring is at a predetermined rotation angle about the optical axis, the engaging parts being configured to be engaged with each other during the attachment or detachment of the drive unit in relation to the lens barrel to allow the attachment or detachment of the drive unit.

11 Claims, 15 Drawing Sheets

(51) Int. Cl.

| | | |
|---|---|---|
| *G03B 17/00* | (2006.01) | |
| *G03B 13/00* | (2006.01) | |
| *G02B 7/04* | (2006.01) | |
| *G02B 7/28* | (2006.01) | |
| *G02B 7/10* | (2006.01) | |
| *G03B 17/56* | (2006.01) | |
| *G03B 3/10* | (2006.01) | |
| *G03B 3/00* | (2006.01) | |
| *G03B 5/00* | (2006.01) | |
| *H04N 5/225* | (2006.01) | |

(52) U.S. Cl.
CPC ................ *G02B 7/282* (2013.01); *G02B 15/14* (2013.01); *G03B 3/10* (2013.01); *G03B 13/00* (2013.01); *G03B 17/568* (2013.01); *G03B 3/00* (2013.01); *G03B 5/00* (2013.01); *G03B 2205/0053* (2013.01); *H04N 5/2254* (2013.01)

(56) References Cited

FOREIGN PATENT DOCUMENTS

| JP | 8-292353 | 11/1996 |
|---|---|---|
| JP | 8-297238 | 11/1996 |
| JP | 2000-50119 | 2/2000 |

\* cited by examiner

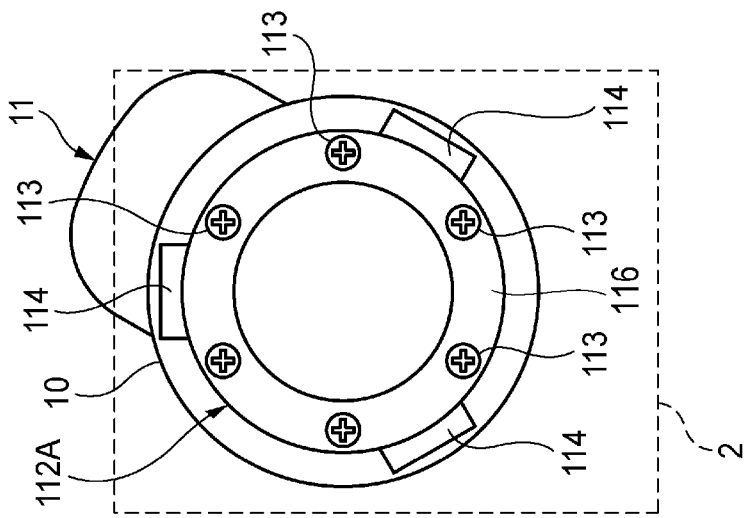
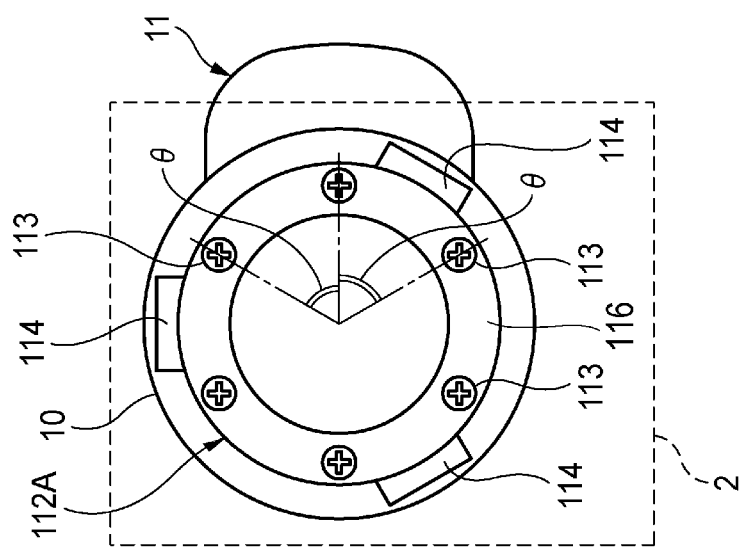

LENS DEVICE AND IMAGING APPARATUS

CROSS REFERENCE TO RELATED APPLICATION

This is a continuation of International Application No. PCT/JP2012/079404 filed on Nov. 13, 2012, and claims priority from Japanese Patent Application No. 2012-019051, filed on Jan. 31, 2012, the entire disclosures of which are incorporated herein by reference.

BACKGROUND

1. Technical Field

The present invention relates to a lens device and an imaging apparatus including a drive unit detachably fixed to an outer circumference of a lens barrel.

2. Related Art

In a lens device of a shouldered camera, such as an electronic news gathering (ENG) camera, a grip may be detachably fixed to an outer circumference of a lens barrel. In addition, the grip is generally equipped with a drive unit for electrically rotating an operation ring such as a zoom operation ring or an iris operation ring provided on the lens barrel.

The drive unit includes a motor, a reduction mechanism configured to transmit a rotating torque of the motor to the operation ring, and a potentiometer configured to detect a rotation angle of the operation ring. Further, the drive unit is configured to drive the motor until the rotation angle detected by the potentiometer reaches a rotation angle corresponding to a command signal that is input from a controller such as an operation switch provided on the grip.

However, when the drive unit is attached to the lens barrel, the rotation angle of the operation ring should be set to be matched to that of the potentiometer for which a jig or the like is required in order to match the rotation angle of the potentiometer and the rotation angle of the operation ring to each other. For this reason, even though the drive unit is detachable or attachable, the detachment or attachment is not easy.

Therefore, there has been proposed a drive unit configured to match a rotation angle of a potentiometer and a rotation angle of an operating ring by frictionally coupling an output shaft of the motor and an input shaft of the potentiometer, and further driving the motor while idling the potentiometer after the potentiometer reaches one side end of a rotation range thereof so as to rotate the operation ring to one side end of a rotation range thereof (see Patent Literature 1 (JP-A-8-292353) and Patent Literature 2 (JP-A-8-297238)).

SUMMARY OF INVENTION

In the drive unit disclosed in Patent Literature 1 and Patent Literature 2, since a frictional coupling is interposed between the output shaft of the motor and the input shaft of the potentiometer, a rotation transmission mechanism may be complicated and detection precision of the rotation angle of the operation ring by the potentiometer may be degraded.

An illustrative aspect of the present invention is to enable proper setting of a rotation angle of an operation ring in relation to a drive unit through a simple configuration and to facilitate the attachment and detachment of the drive unit.

(1) It is a lens device, comprising: a lens barrel configured to accommodate an image-formation optical system including at least one movable optical element, the lens barrel including an operation ring provided to be rotatable about an optical axis of the image-formation optical system to adjust the movable optical element; a drive unit including a drive part configured to rotatably drive the operation ring, the drive unit being detachably fixed to a predetermined portion on an outer circumference of the lens barrel, in which the drive unit moves in relation to the lens barrel in a direction of the optical axis to be attached to or detached from the lens barrel, and the operation ring and the drive unit are respectively provided with engaging parts, in which, when the operation ring is at a predetermined rotation angle about the optical axis, the engaging parts being configured to be engaged with each other during the attachment or detachment of the drive unit in relation to the lens barrel to allow the attachment or detachment of the drive unit.

(2) It is an imaging apparatus having the lens device of (1).

According to the present invention, when the drive unit is attached to or detached from the lens barrel, the operation ring is arranged at a predetermined rotation angle by the engagement of an engagement part of each of the operation ring and the drive ring in the process of the attachment or detachment. This allows the rotation angle of the operation ring to be properly set in relation to the drive unit so that the attachment or detachment of the drive unit can be easily performed.

BRIEF DESCRIPTION OF DRAWINGS

FIGS. 14A to 14C are schematic views illustrating a configuration of a mount of the lens device of FIG. 13.

DESCRIPTION OF EMBODIMENTS

Figure 1:
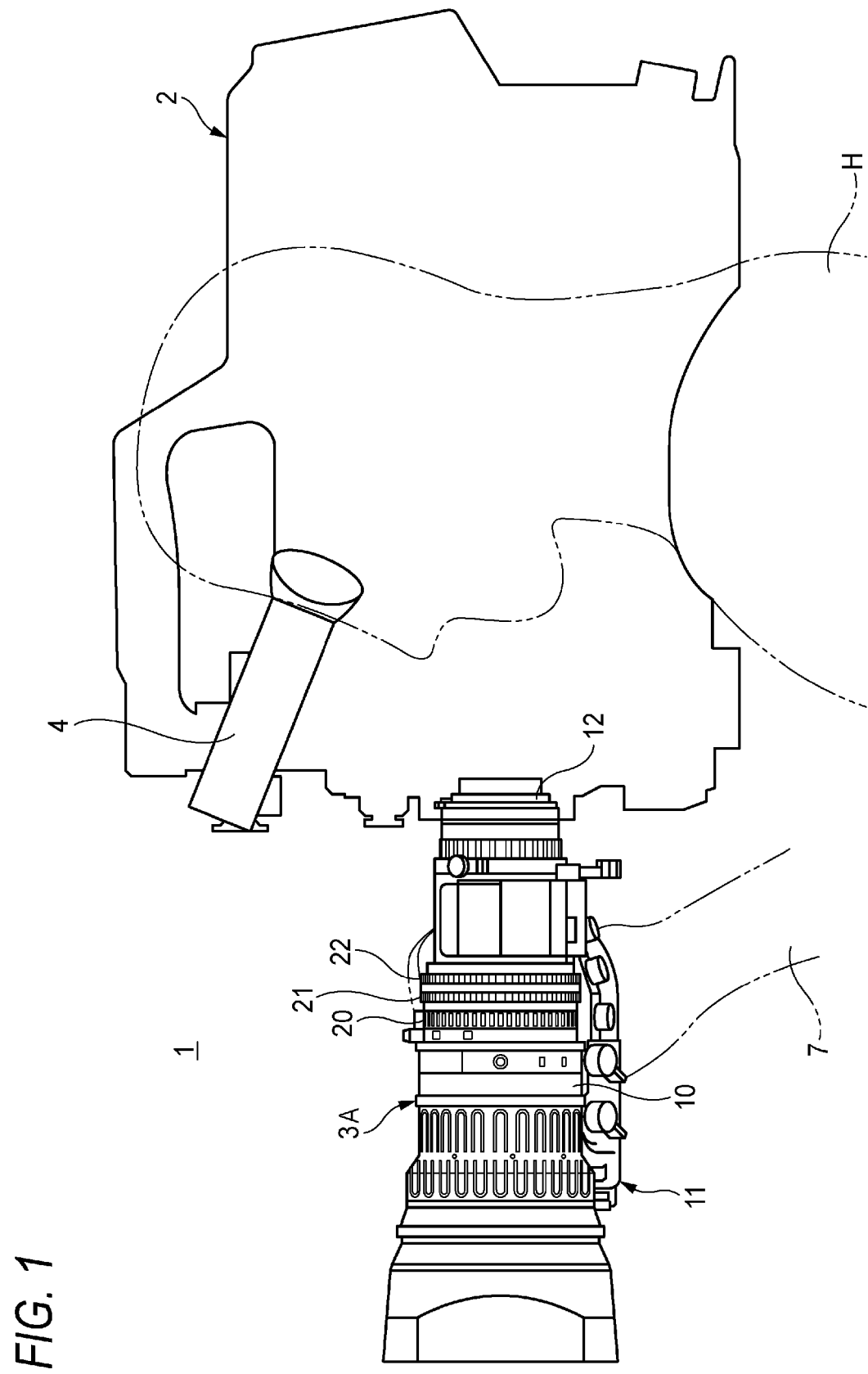
FIG. 1 is a schematic view illustrating a configuration of an example of an imaging apparatus including a lens device for describing an exemplary embodiment of the present invention.

FIG. 1 illustrates a configuration of an example of a lens device and an imaging apparatus having the lens device, for describing an exemplary embodiment of the present invention.

An imaging apparatus 1 is provided with a main body 2 having an imaging element such as a CCD image sensor, and a lens device 3A detachably fixed to the main body 2. Further, the lens device 3A is provided with a lens barrel 10 of a tubular shape such as a cylindrical shape and a grip 11 detachably fixed to the outer circumference of the lens barrel 10.

Optical elements that constitute an optical system configured to form an image on the imaging element of the main body 2, such as a leans or an iris of a zoom lens or a focus lens and an iris, are held in the lens barrel 10. A mount 12 is provided on a base portion of the lens barrel 10. The lens device 3A is fixed to the main body 2 by engaging the mount 12 with a lens mounting portion provided on the main body 2.

A photographer H typically shoulders the main body 2 on his or her right shoulder, and holds the grip 11 of the lens device 3A with his or her right hand 7 to fix the imaging apparatus 1. The photographer H adjusts the zoom, the focus or the iris of the lens device 3A and takes a photograph of a subject while looking in a viewfinder 4 provided on the main body 2 with right eye.

Figure 2:
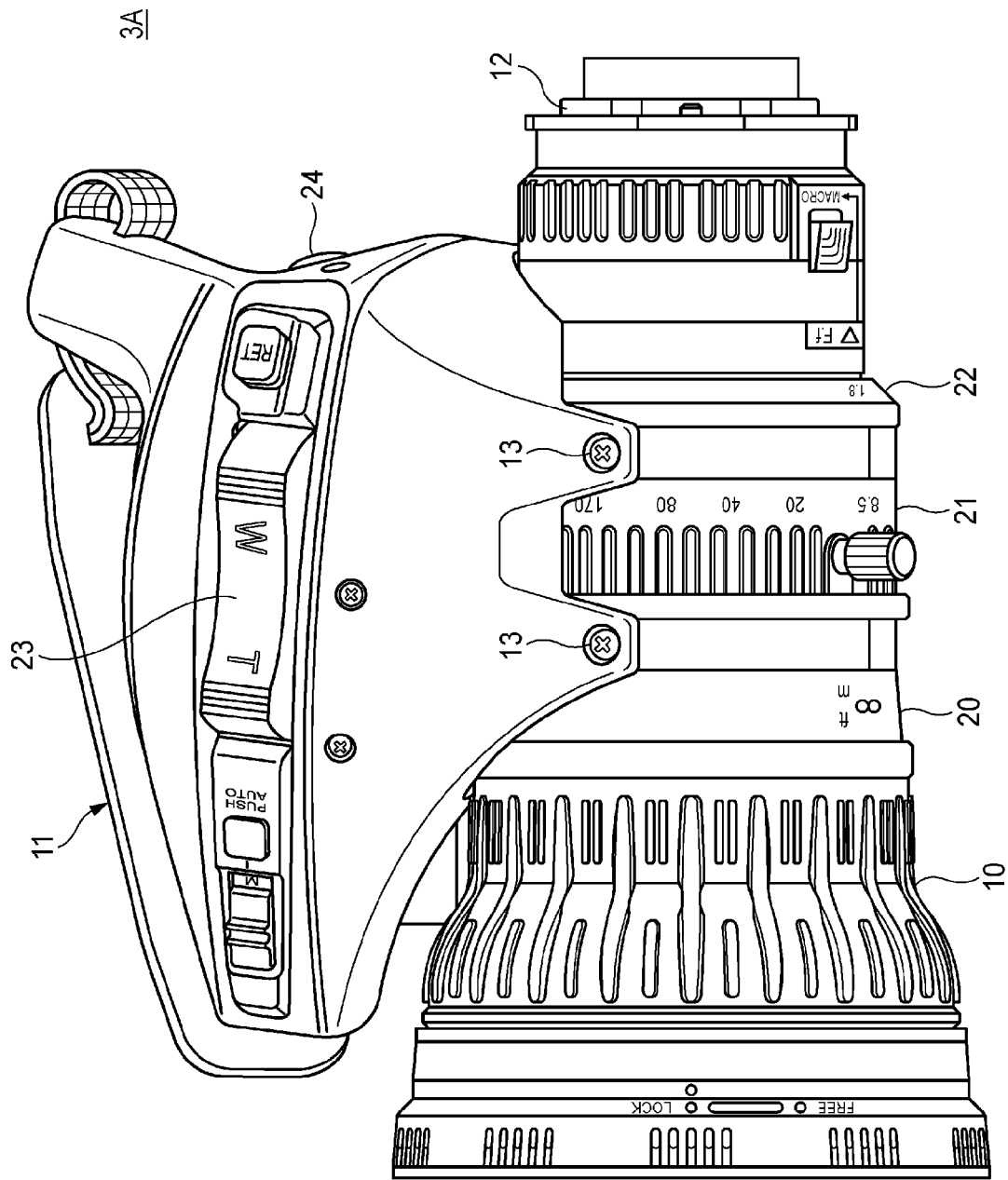
FIG. 2 is a plan view illustrating the lens device of FIG. 1.

FIG. 2 illustrates the external appearance of the lens device 3A.

A focus ring 20 configured to adjust the focus, a zoom ring 21 configured to adjust the zoom, and an iris ring 22 configured to adjust the iris are mounted on the lens barrel 10 to be rotatable around an optical axis of the optical system accommodated in the lens barrel 10. The focus lens moves back and forth along the optical axis in an interlocking manner with the rotation of the focus ring 20 so as to adjust the focus. The zoom lens moves back and forth along the optical axis in an interlocking manner with the rotation of the zoom ring 21 so as to adjust the zoom. Further, a plurality of diaphragm blades constituting the iris is opened or closed in an interlocking manner with the rotation of the iris ring 22 so as to adjust the iris.

The grip 11 is equipped with a drive unit configured to electrically rotate the above-mentioned operation rings (the focus ring 20, the zoom ring 21, and the iris ring 22). Various operation switches, including a seesaw switch 23 configured to adjust the zoom by the drive unit and a recording switch 24 configured to instruct ON/OFF of the recording by the imaging apparatus 1 are provided on an external surface of the grip 11.

Figure 3:
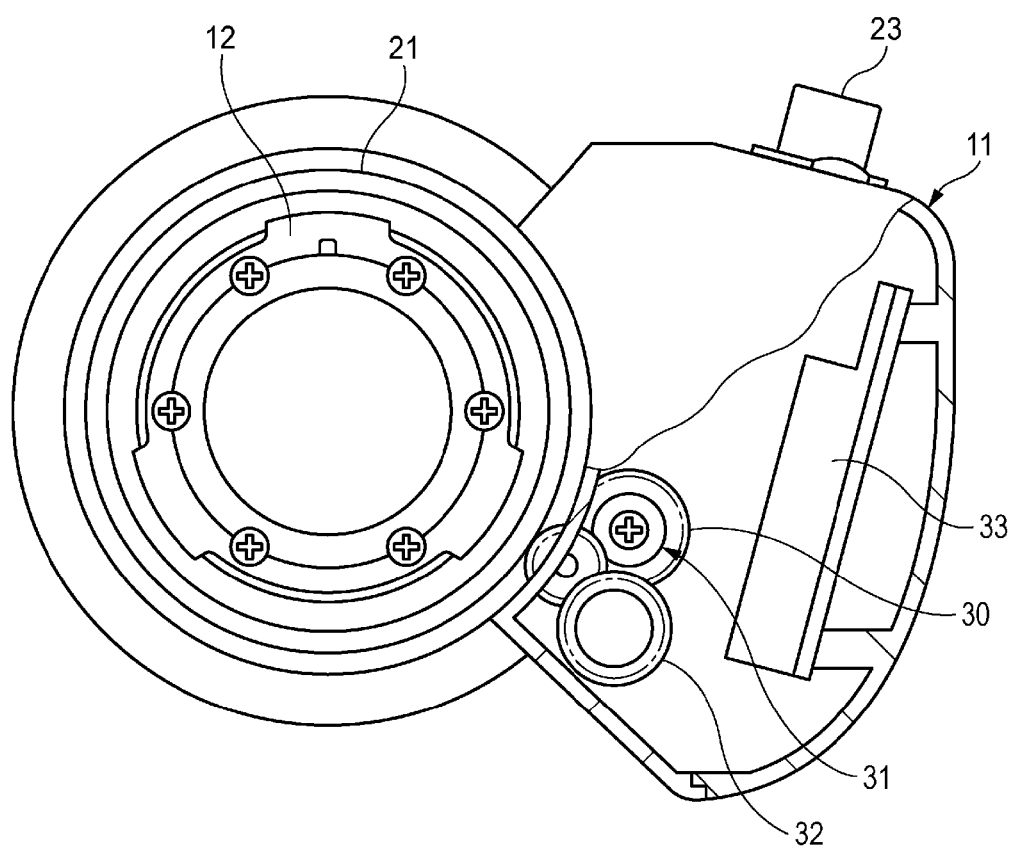
FIG. 3 is a schematic view illustrating a configuration of a drive unit of the lens device of FIG. 1.

FIG. 3 illustrates the configuration of the drive unit.

The drive unit includes a motor 30, a reduction mechanism 31 configured to transmit a rotating torque of the motor 30 to the operation rings, a potentiometer 32 engaged with the operation ring to detect the rotation angles of the operation rings, and a control unit 33 configured to drive the motor 30 based on the rotation angle detected by the potentiometer 32. Although not illustrated in the drawing, the motor 30, the reduction mechanism 31 and the potentiometer 32 are installed on each of the operation rings (the focus ring 20, the zoom ring 21, and the iris ring 22).

When the zoom is adjusted by the drive unit, the seesaw switch 23 is operated by an operator H, so that the command signal indicating the rotation angle of the zoom ring 21 depending on the operating quantity is input to the control unit 33 of the drive unit. The control unit 33 drives the motor 30 until the rotation angle of the zoom ring 21 detected by the potentiometer 32 reaches the rotation angle corresponding to the command signal. This causes the zoom ring 21 to be set to a desired rotation angle so as to adjust the zoom.

Also, as to the adjustment of the focus or the iris, the command signal indicating the rotation angle of the focus ring 20 or the iris ring 22 is input from an outside (e.g., an auto focus control unit or an auto-exposure control unit provided on the main body 2 of the imaging apparatus) to the control unit 33 of the drive unit. The control unit 33 drives the motor 30 until the rotation angle of the focus ring 20 or the iris ring 22 detected by the potentiometer 32 reaches the rotation angle corresponding to the command signal.

The grip 11 configured as described above is detachably fixed by a fastening screw 13 (see FIG. 2) to a predetermined portion on the outer circumference of the lens barrel 10. When the grip 11 is attached to the lens barrel 10, the rotation angle of each of the operation rings (the focus ring 20, the zoom ring 21, and the iris ring 22) is set to be matched with the rotation angle of the potentiometer 32 corresponding to the operation ring. Hereinafter, descriptions will be made on an attachment structure for the drive unit (the grip 11) configured to ensure that the rotation angle of the operation ring is matched with the rotation angle of the potentiometer 32.

Figure 4:
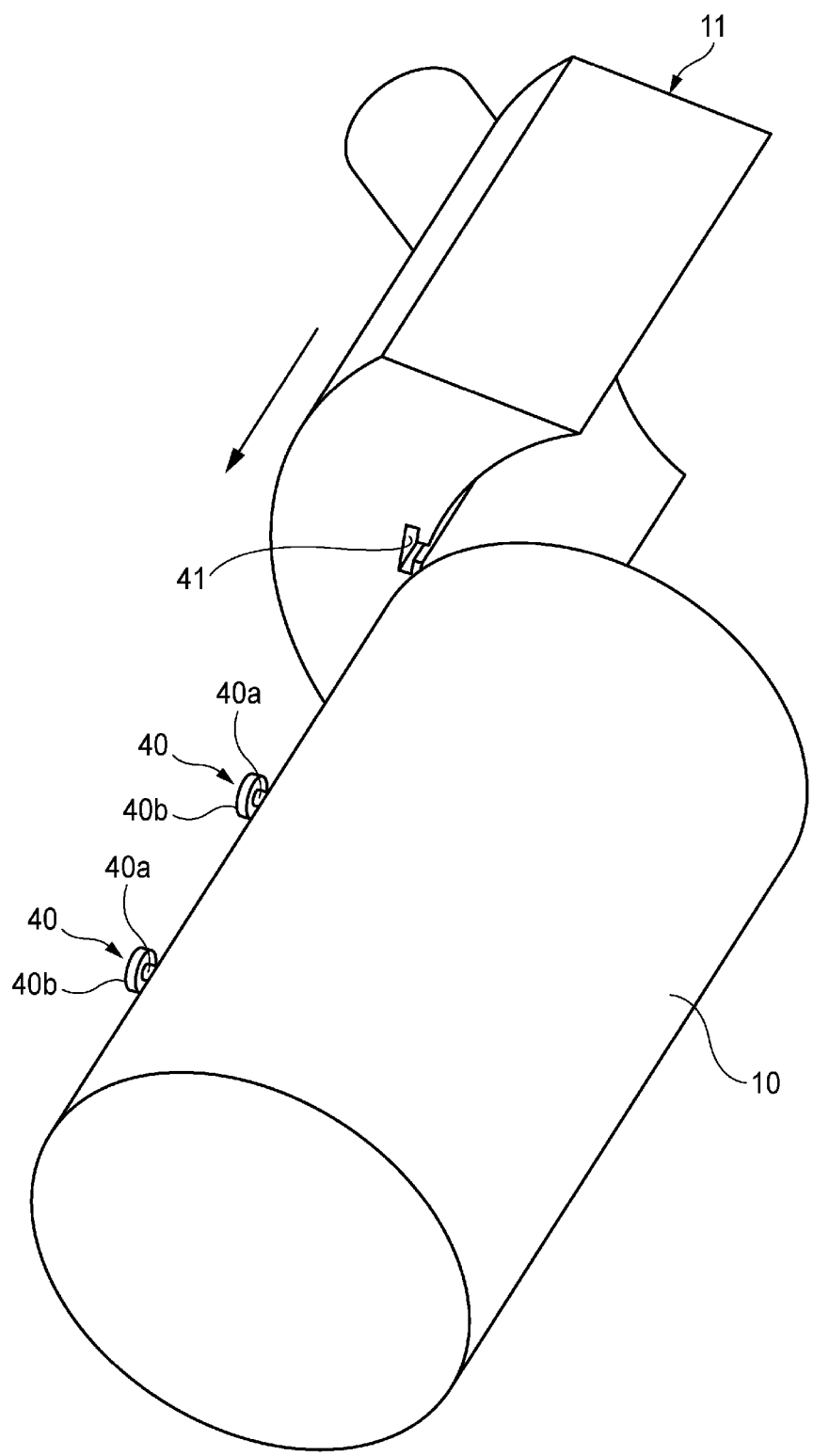
FIG. 4 is a schematic view illustrating an attachment structure of attaching the drive unit to a lens barrel in the lens device of FIG. 1.
Figure 5:
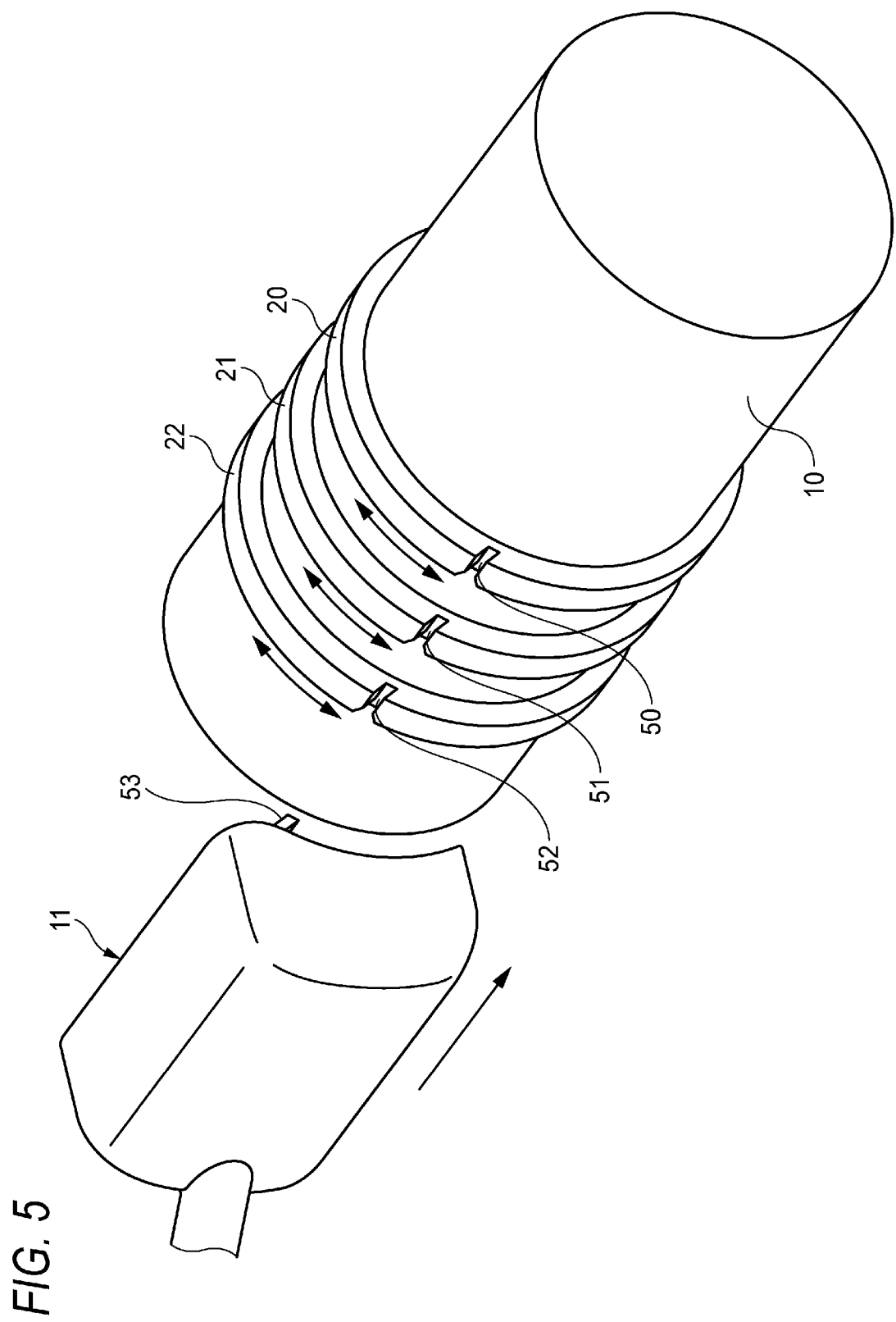
FIG. 5 is a schematic view illustrating an attachment structure of attaching the drive unit to the lens barrel in the lens device of FIG. 1.

FIGS. 4 and 5 illustrate the attachment structure of attaching the drive unit (the grip 11) to the lens barrel 10.

In the lens device 3A, the grip 11 equipped with the drive unit slides along the optical axis in relation to the lens barrel 10 to be attached to or detached from the lens barrel 10. Each of the lens barrel 10 and the grip 11 is provided with a guide part configured to guide the sliding movement of the grip 11.

In the illustrated example, a plurality of guide protrusions 40 is provided to be aligned along the optical axis on an area on the outer circumference of the lens barrel 10 to which the grip 11 is attached. Each guide protrusion 40 has a cylindrical shaft portion 40a and a disc-shaped head portion 40b having a diameter larger than that of the shaft portion 40a, and is formed in an approximate T shape when viewed from a cross-section including the central axis thereof.

A guide slot 41 is formed in a surface of the grip 11 facing the outer circumference of the lens barrel 10 in the state where the grip 11 is attached to the outer circumference of the lens barrel 10, in which the guide slot 41 extends along the optical axis and reaches side surfaces of both sides in the direction of the optical axis of the grip 11. The guide slot 41 is formed in an approximately T-shape in cross-section to correspond to the guide protrusion 40 of the lens barrel 10.

The guide protrusion 40 formed the approximately T-shape in cross-section may enter into the guide slot 41 and retreat out of the guide slot 41 having the approximately T-shape in cross-section through only open ends on the side surfaces of the grip 11. Here, the guide protrusion 40 may enter into and retreat out of the guide slot 41 along the optical axis. By the guide protrusion 40 and the guide slot 41 engaged with each other in this manner, the grip 11 slides along the optical axis in relation to the lens barrel 10 to be attached to or detached from the lens barrel 10.

In addition, engaging parts are provided on the outer circumference of each of the operation rings (the focus ring 20, the zoom ring 21, and the iris ring 22) and the inner surface of the grip 11 to be engaged with each other in the process of attaching or detaching the grip 11 in relation to the lens barrel 10 which involves the sliding movement of the grip 11 along the optical axis.

An engaging recess 50 is formed on the outer circumference of the focus ring 20 to extend along the optical axis and reach side surfaces of both sides in the direction of the optical axis of the focus ring 20. Likewise, engaging recesses 51 and 52 are also formed respectively in the zoom ring 21 and the iris ring 22. The engaging recesses 50, 51 and 52 are respectively formed on the operation rings to be aligned along the optical axis when each of the operation rings is at a predetermined rotation angle. The predetermined rotation angle of each of the operation rings may be set as, for example, one side end in the rotation range of each of the operation rings.

An engaging protrusion 53 is formed on a surface of the grip 11 facing the lens barrel 10. The engaging protrusion 53 is provided to overlap with the side surfaces of the operation rings in the direction of the optical axis, respectively. When each of the operation rings is at the predetermined rotation angle, the engaging protrusion 53 is aligned with the engaging recesses 50, 51 and 52 of the operation rings in the direction of the optical axis.

Next, the process of attaching and detaching the grip 11 in relation to the lens barrel 10 will be described.

First, descriptions will be made on a case in which each potentiometer 32 of the drive unit is matched with a predetermined rotation angle of the corresponding operation ring and the grip 11 is attached to the lens barrel 10.

When at least one operation ring is at a rotation angle that is different from the predetermined rotation angle set for the operation ring, the engaging protrusion 53 comes into contact with the side surface of the operation ring while the grip 11 slides along the optical axis based on the guide by the guide protrusion 40 and the guide slot 41. As a result, the sliding movement beyond the grip 11 is blocked and the attachment of the grip 11 to the lens barrel 10 is also prevented.

On the contrary, when all of the operation rings are at predetermined rotation angles, the engaging recesses 50, 51 and 52 are aligned along the optical axis, and the engaging protrusion 53 sequentially passes through the engaging recesses 50, 51 and 52 following the sliding movement of the grip 11. That is, the attachment of the grip 11 to the lens barrel 10 is allowed.

Figure 6:
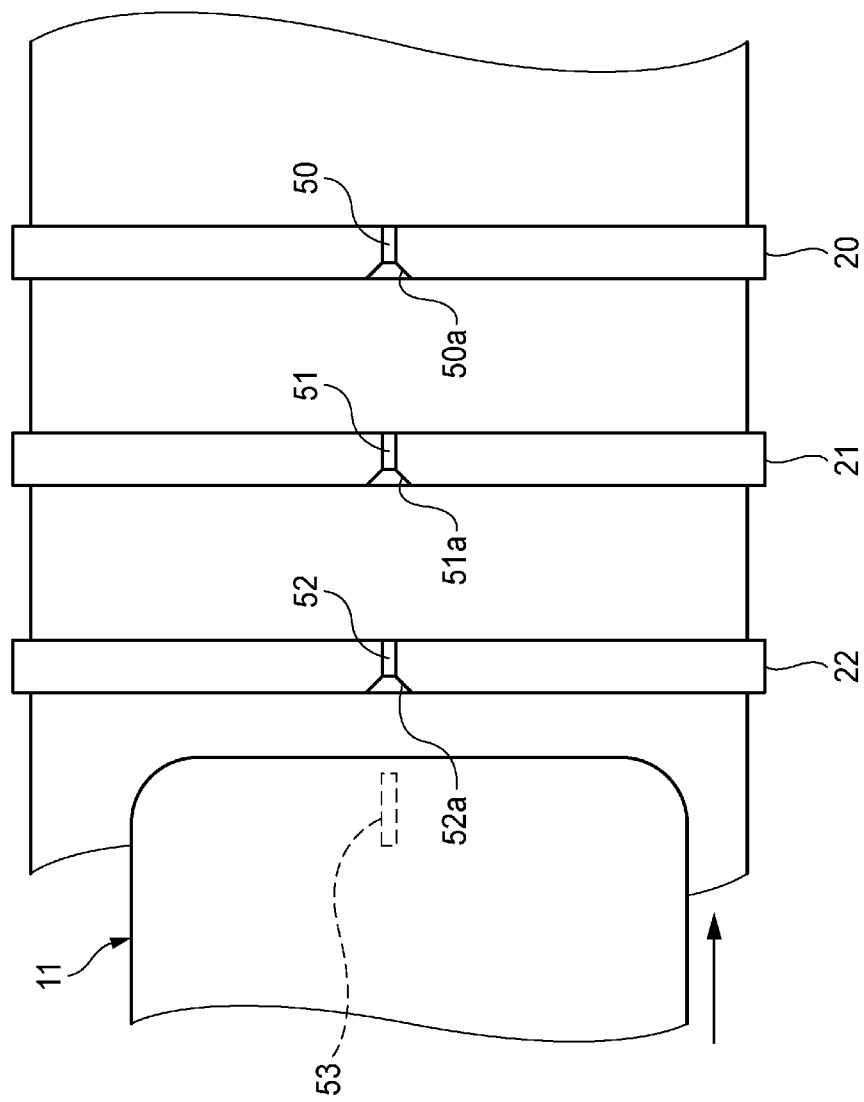
FIG. 6 is a plan view illustrating the attachment structure of attaching the drive unit to the lens barrel of the lens device illustrated in FIG. 5.

As illustrated in FIG. 6, among both ends of each of engaging 50, 51 and 52 in the direction of the optical axis, an end 50a, 51a, or 52a serving as an entrance for the engaging protrusion 53, at least when the grip 11 is attached to the lens barrel 10, may have a tapered shape that is gradually enlarged toward an end thereof. Such a configuration allows the engaging protrusion 53 to enter smoothly the engaging recess of the operation ring, even if the rotation angles of the operation rings are slightly different from the predetermined rotation angles. Further, the ends of the engaging recesses 50, 51 and 52 may be tapered. Alternatively, the ends 50a, 51a, 52a of the engaging recesses 50, 51 and 52 may be tapered and the engaging protrusion 53 may be tapered to be gradually constricted in the entrance direction to the engaging recesses 50, 51 and 52.

Since the rotation angle of each potentiometer 32 is matched with the predetermined rotation angle of the corresponding operation ring as described above, a state where the rotation angle of each potentiometer 32 and the rotation angle of the operation ring corresponding to the potentiometer 32 are matched with each other is obtained when the grip 11 is attached to the lens barrel 10. Subsequently, the grip 11 is fixed to the lens barrel 10 by the fastening screw 13 (see FIG. 2).

Next, descriptions will be made on a case where the grip 11 is removed from the lens barrel 10.

When at least one operation ring is at a rotation angle that is different from the predetermined rotation angle set for the operation ring, the engaging protrusion 53 comes into contact with the side surface of the operation ring while the grip 11 slides along the optical axis based on the guide of the guide protrusion 40 and the guide slot 41. As a result, the sliding movement of the grip 11 is blocked, and the removal of the grip 11 from the lens barrel 10 is also prevented.

On the contrary, when all of the operation rings are at the predetermined rotation angles, the engaging recesses 50, 51 and 52 are aligned along the optical axis, and the engaging protrusion 53 sequentially passes through the engaging recesses 50, 51 and 52 following the sliding movement of the grip 11. That is, the removal of the grip 11 to the lens barrel 10 is allowed.

Among both ends of each of engaging 50, 51 and 52 in the direction of the optical axis, an end serving as an entrance for the engaging protrusion 53, when the grip 11 is at least removed from the lens barrel 10, may be formed in a tapered shape that is gradually enlarged toward the end thereof. This allows the engaging protrusion 53 to enter smoothly the engaging recess of the operation ring, even if the rotation angles of the operation rings are slightly different from the predetermined rotation angles. Further, the ends of the engaging recesses 50, 51 and 52 may be tapered. Alternatively, the ends of the engaging recesses 50, 51 and 52 may be tapered and the engaging protrusion 53 may be tapered to be gradually constricted in the entrance direction to the engaging recesses 50, 51 and 52.

In the state where the rotation angle of each potentiometer 32 is matched with the predetermined rotation angle of the corresponding operation ring, the grip 11 is removed from the lens barrel 10. As long as this state is maintained until the grip 11 is attached to the lens barrel 10 again, a state where the rotation angle of each potentiometer 32 and the rotation angle of the operation ring corresponding to the potentiometer 32 are matched with each other is obtained when the grip 11 is attached to the lens barrel 10 again.

According to the above-mentioned lens device 3A, when the grip 11 equipped with the drive unit is attached to or detached from the lens barrel 10, the operation rings 20, 21 and 22 are arranged at the predetermined rotation angles by the respective engagement between the engaging recesses 50, 51 and 52 of the operation rings 20, 21 and 22 and with the engaging parts of the drive unit during the attachment or detachment. This allows the rotation angles of the operation rings 20, 21 and 22 to be appropriately set in relation to the drive unit, and thus, the attachment or detachment of the drive unit may be easily performed.

It has been described that in the above-mentioned lens device 3A, the engaging recesses 50, 51 and 52 are respectively formed on the operation rings and the engaging protrusion 53 is provided on the grip 11 as engaging parts that engages with each other in the process of attaching or detaching the grip 11 in relation to the lens barrel 10 and allow the attachment or detachment of the grip 11 in relation to the lens barrel 10. However, an engaging protrusion may be provided on each of the operation rings and an engaging recess may be formed on the grip 11.

It has been described that the guide protrusion 40 is provided on the lens barrel 10 and the guide slot 41 is formed in the grip 11 as the guide parts that guide the sliding movement of the grip 11 along the optical axis. However, a guide slot may be formed in the lens barrel 10 and a guide protrusion may be provided on the grip 11.

Figure 7:
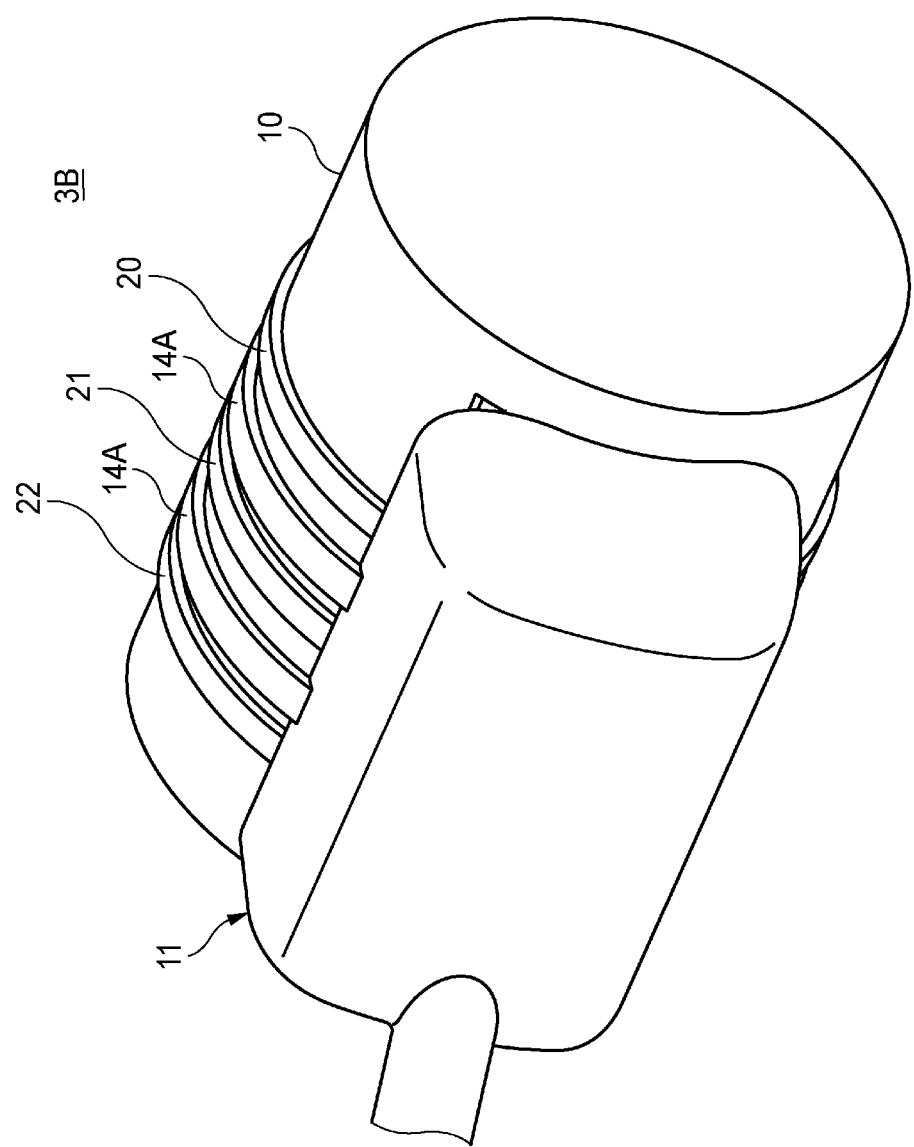
FIG. 7 is a schematic view illustrating a configuration of a modified example of the lens device illustrated in FIG. 1.
Figure 8:
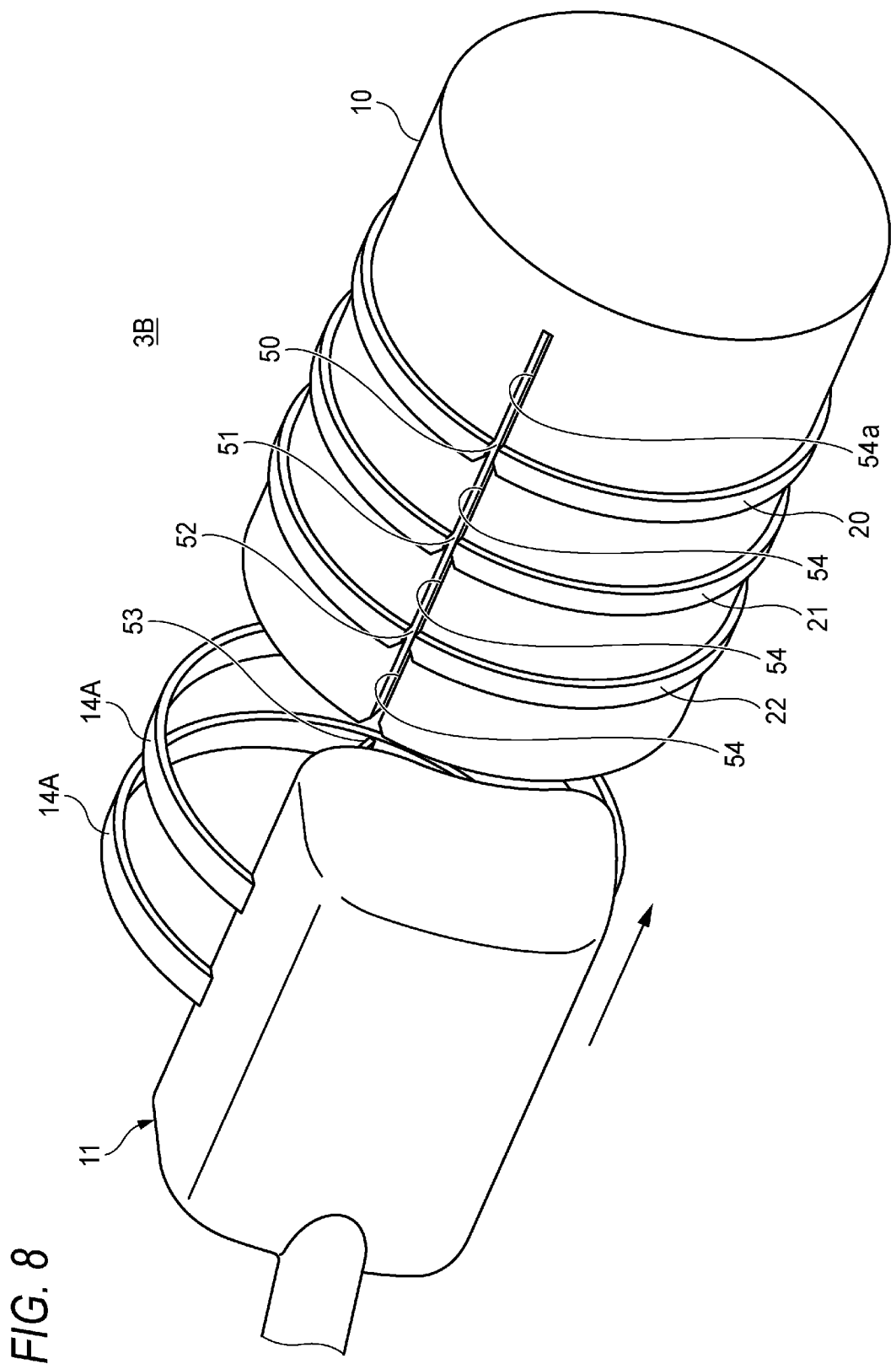
FIG. 8 is a schematic view illustrating a state in which the drive unit is removed from the lens barrel in the lens device of FIG. 7.

FIGS. 7 and 8 illustrate a modified example of the above-mentioned lens device 3A.

In the above-mentioned lens device 3A, the grip 11 is fixed to the lens barrel 10 via the fastening screw 13. However, in the lens device 3B illustrated in FIG. 7, the grip 11 is fixed to the lens barrel 10 via a fixture 14A.

Figure 9:
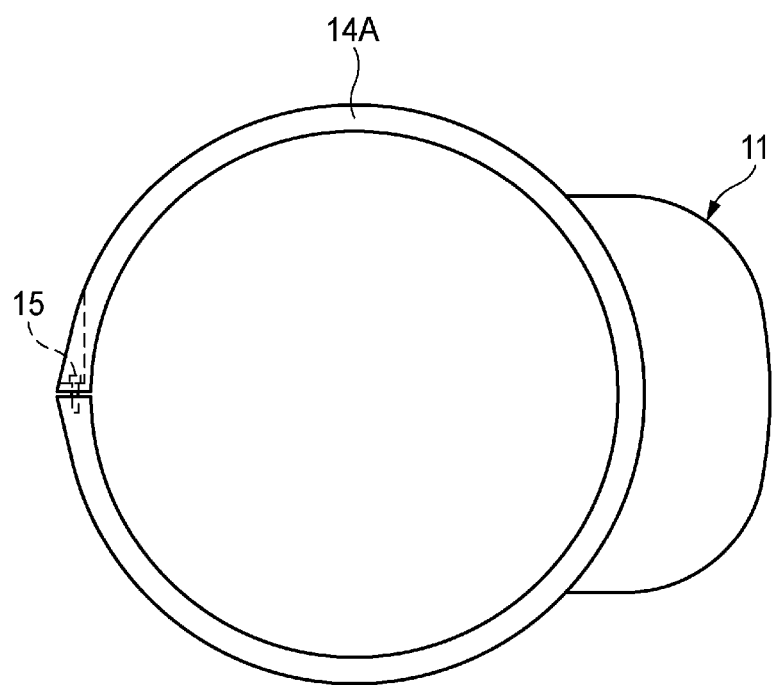
FIG. 9 is a front view illustrating a fixture that fixes the drive unit to the lens barrel in the lens device of FIG. 7.

FIG. 9 illustrates the configuration of the fixture 14A.

The fixture 14A is formed in an annular shape and is split at a point in a circumferential direction thereof and the split point is joined via a screw 15. When the screw 15 is tightened, the diameter of the fixture 14A is reduced to wrap and fasten the outer circumference of the lens barrel 10 which causes the grip 11 to be fixed to the lens barrel 10.

Since the fixture 14A is formed in the annular shape, the grip 11 is attached or detached in relation to the lens barrel 10 to inevitably insert or pull the lens barrel 10 into or out the fixture 14A. At this time, the grip 11 slides along the optical axis in relation to the lens barrel 10. As such, since the fixture 14A configured to fix the grip 11 to the lens barrel 10 also serves as a guide part that guides the slidable movement of the grip 11, the configuration may be simplified as compared to the case where the guide part is separately provided. Since the fixture 14A is formed in the annular shape to wrap the outer circumference of the lens barrel 10, it can reliably prevent the grip 11 from being detached or attached in relation to the lens barrel 10 in a direction perpendicular to the optical axis.

Here, the grip 11 is fixed to the lens barrel 10 by friction generated between the inner circumference of the fixture 14A and the outer circumference of the lens barrel 10. However, when no friction is generated because the screw 15 is loosened during the attachment or detachment of the grip 11, or an excessively large external force is exerted over the friction even though the attachment of the grip 11 is completed and the screw 15 is fastened, the grip 11 may be rotated about the optical axis when the guide is performed merely by the fixture 14A. Thus, in this example, the engaging protrusion 53 is also used as the guide part that guides the sliding movement of the grip 11 along the optical axis.

The bottom parts of the engaging recesses 50, 51 and 52 of the operation rings (the focus ring 20, the zoom ring 21, and the iris ring 22) are positioned at an optical-axis side (inner-circumference side) as compared to the outer circumference of the lens barrel 10. A groove 54 is further formed on the outer circumference of the lens barrel 10 to connect the engaging recesses (between the engaging recesses 50 and 51, and between the engaging recesses 51 and 52) of two neighboring operation rings and extend on both sides along the optical axis.

When all of the operation rings are at the predetermined rotation angles, the engaging recesses 50, 51 and 52, and the groove 54 are aligned along the optical axis, so that the engaging protrusion 53 sequentially passes through the engaging recesses 50, 51 and 52 following the sliding movement of the grip 11 which allows the attachment and detachment of the grip 11 in relation to the lens barrel 10. When the engaging protrusion 53 is positioned between the two neighboring engaging recesses during the attachment or detachment, it proceeds to the groove 54. In the state where the grip 11 is attached to the lens barrel 10, the engaging protrusion 53 is received in one side end 54a of the groove 54 of the lens barrel 10. As such, while the grip 11 is being attached to or detached from the lens barrel 10 and in the state where the grip 11 is attached to the lens barrel 10, the grip 11 is prevented from rotating about the optical axis by the engagement between the engaging protrusion 53 and the groove 54 so that the sliding movement of the grip 11 can be guided.

Figure 10:
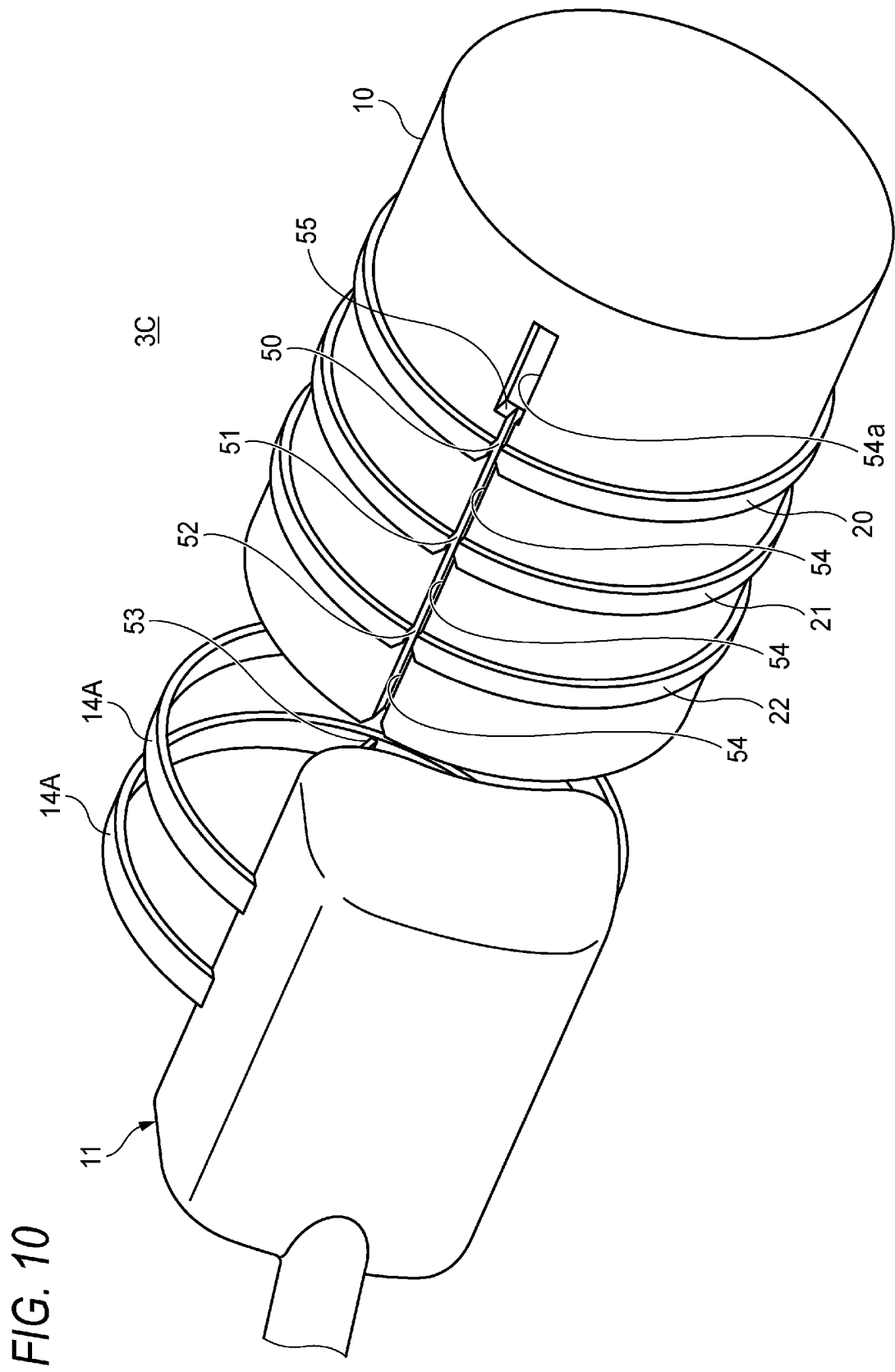
FIG. 10 is a schematic view illustrating a configuration of a modified example of the lens device illustrated in FIG. 7.

FIG. 10 illustrates a modified example of the above-described lens device 3B.

In the lens device 3C illustrated in FIG. 10, a groove 55 extending continuously from the end 54a of the groove 54 in a circumferential direction is formed on the outer surface of the lens barrel 10 to receive the engaging protrusion 53.

Figure 11A:
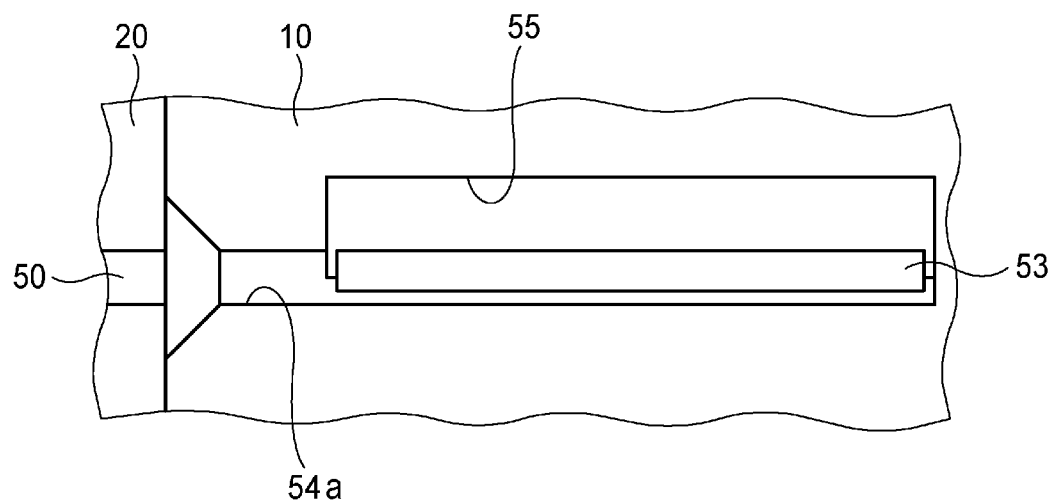
FIGS. 11A and 11B are views illustrating a process of attaching the drive unit to the lens barrel in the lens device of FIG. 10.
Figure 11B:
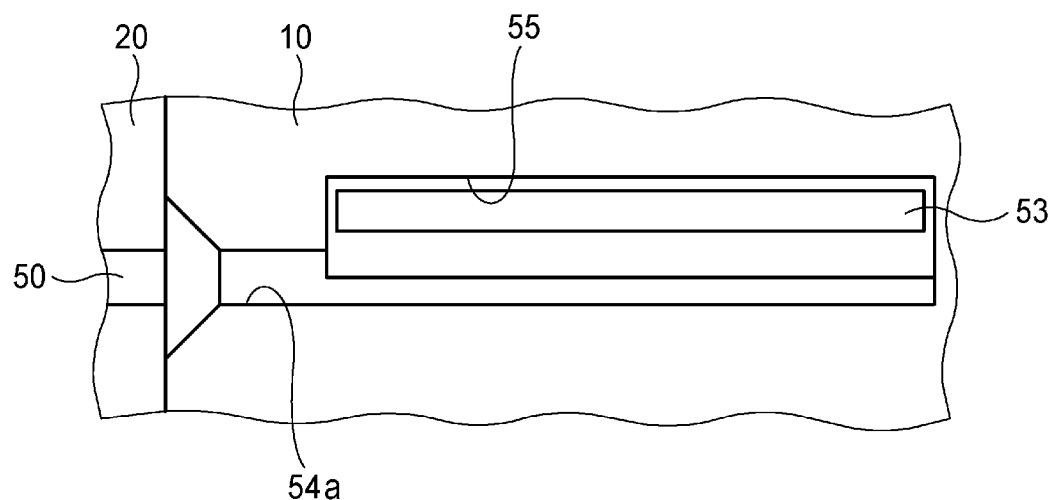

FIGS. 11A and 11B illustrate a process of attaching the grip 11 to the lens barrel 10 in the lens device 3C.

In the above-described lens device 3B, in the state where the grip 11 is attached to the lens barrel 10, the engaging protrusion 53 is received in an end 54a of the groove 54 of the lens barrel 10, thereby preventing the grip 11 from rotating about the optical axis. Whereas, in the lens device 3C of the present example, when the grip 11 is rotated in the circumferential direction of the lens barrel 10 after the engaging protrusion 53 reaches the end 54a of the groove 54 (FIG. 11A), the engaging protrusion 53 is received in the groove 55 (FIG. 11B).

As described above, the grip 11 is fixed to the lens barrel 10 by the friction generated between the inner circumference of the fixture 14A and the outer circumference of the lens barrel 10. However, even when no friction is generated or an excessively large external force is exerted over the friction, the movement of the grip 11 in the direction of the optical axis may be blocked by the engagement between the engaging protrusion 53 and the groove 55.

Figure 12:
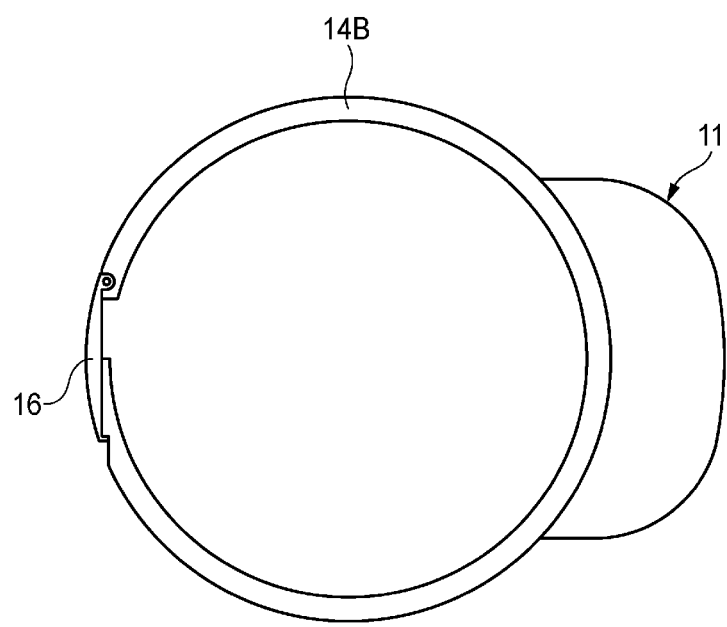
FIG. 12 is a front view illustrating a modified example of the fixture illustrated in FIG. 9.

FIG. 12 illustrates a modified example of the fixture 14A.

As illustrated in FIG. 12, a fixture 14B is formed in an annular shape and is split at a point in the circumferential direction thereof. A split point is joined by a locking pawl 16. Such a configuration allows the split point to be connected in a one-touch manner so as to reduce the diameter of the fixture 14B so that the grip 11 can be easily fixed to the lens barrel 10.

Figure 13:
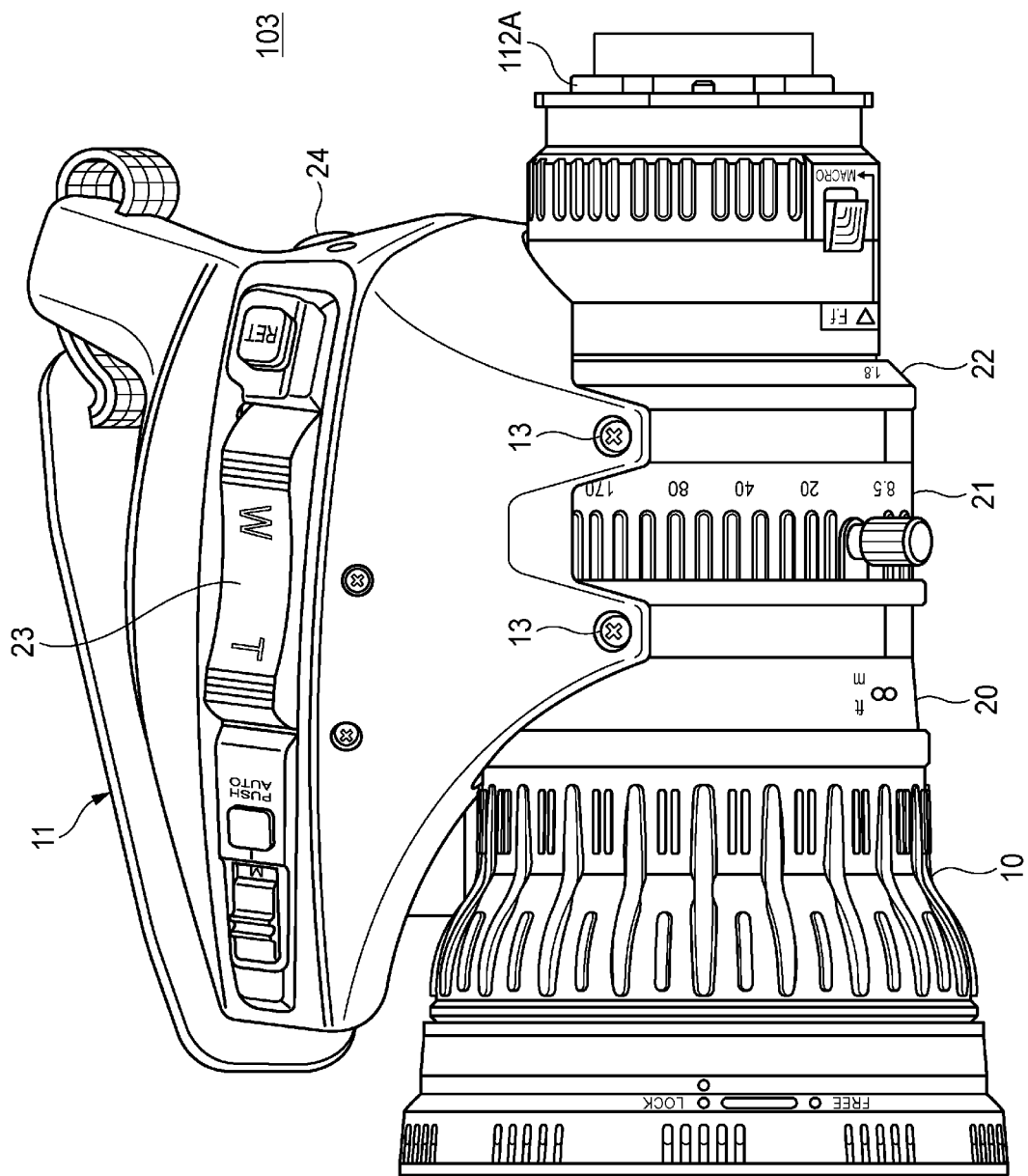
FIG. 13 is a plan view illustrating another example of a lens device for describing an exemplary embodiment of the present invention.

FIG. 13 illustrates a configuration of another example of the lens device. Elements common to those of the lens devices 3A to 3C will be assigned the same reference numerals and the detailed descriptions thereof will be omitted.

In the above-described lens devices 3A to 3C, the position of the grip 11 in relative to the lens barrel 10 remains unchanged in the state where the grip 11 is attached to the lens barrel 10. On the other hand, the lens device 103 is configured such that the rotation angle of the grip 11 about the optical axis is variable in relation to the main body 2.

The lens device 103 is provided with a lens barrel 10, and a grip 11 fixed to the outer circumference of the lens barrel 10.

According to the present example, the grip 11 is fixed to the outer circumference of the lens barrel 10 via a fastening screw 13, similarly to the above-mentioned lens device 3A. Thus, the rotation angle of the grip 11 about the optical axis remains unchanged in relation to the lens barrel 10.

A mount 112A is provided on the base portion of the lens barrel 10. When the mount 112A is engaged with the lens mounting portion provided on the main body 2 (see FIG. 1) of the imaging apparatus, the lens device 103 is fixed to the main body 2.

FIGS. 14A to 14C illustrate the configuration of the mount 112A.

The mount 112A is a so-called bayonet mount which is provided with an annular ring 116 and a plurality of pawls 114 arranged in a circumferential direction of the ring 116 at predetermined intervals. The lens mounting portion of the main body 2 is also provided with a plurality of pawls. When the mount 112A is inserted into the lens mounting portion and is rotated about the optical axis along with the lens device 103, the pawls 114 of the mount 112A are engaged with the pawls of the lens mounting portion, thereby fixing the lens device 103 to the main body 2 of the imaging apparatus.

The mount 112A is fastened to the base portion of the lens barrel 10 via a plurality of mount fastening screws 113. The mount fastening screws 113 are arranged on the annular mount 112A at regular intervals in a circumferential direction thereof. Consequently, the mount fastening screws 113 are arranged at a same radius from the optical axis and at an interval of a predetermined angle θ about the optical axis. Thus, the lens barrel 10 is configured to rotate about the optical axis at the interval of the predetermined angle θ in relation to the mount 112A, and to be capable of being fixed to the mount 112A.

When the fixed angle of the lens barrel 10 in relation to the mount 112A is rotated at the interval of the angle θ to cause the lens device 103 to be fixed to the main body 2 of the imaging apparatus, the lens barrel 10 and the grip 11 fixed to the lens barrel 10 are disposed after being rotated about the optical axis at the interval of the angle θ in relation to the main body 2. This makes the rotation angle of the grip 11 variable in relation to the main body 2. Such a configuration allows the position of the grip 11 to be adjusted depending on the individual difference of an operator, such as a build or a taste, or a photographing condition, thus reducing the burden on the operator.

FIG. 15 illustrates a configuration of a modified example of the above-described mount 112A.

Figure 15A:
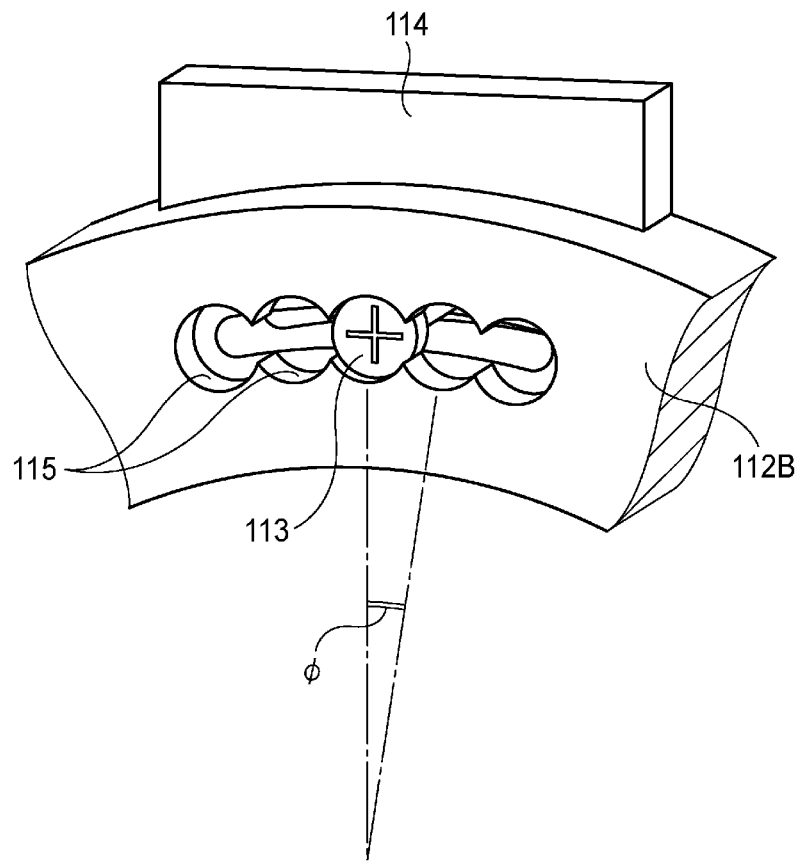
FIGS. 15A and 15B are perspective views illustrating a configuration of a modified example of the mount of FIGS. 14A to 14C.
Figure 15B:
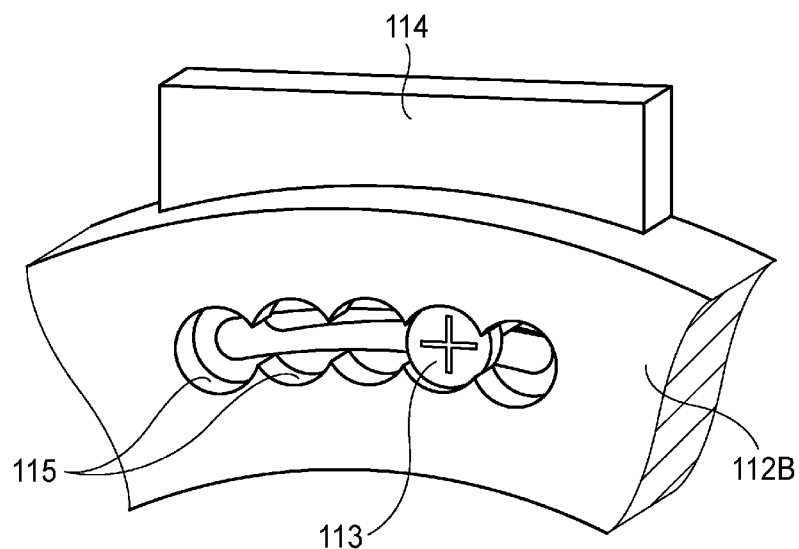

A mount 112B illustrated in FIGS. 15A and 15B is fastened to the base portion of the lens barrel 10 via a plurality of mount fastening screws 113 that is arranged at the interval of the predetermined angle θ from the optical axis. In each fastening area where the mount fastening screws 113 are fastened in the mount 112B, a plurality of insertion holes 115, through which the mount fastening screws are inserted, is formed at the interval of the predetermined angle θ from the optical axis.

In each fastening area where the mount fastening screws 113 are fastened, the insertion holes 115, into which the mount fastening screws 113 are inserted, are sequentially deviated from each other so that, when the lens device 103 is fixed to the main body 2, the lens barrel 10 and the grip 11 fixed to the lens barrel 10 are disposed after being rotated about the optical axis at an interval of an angle φ in relation to the main body 2 of the imaging apparatus.

The disposition angle φ of the insertion holes 115 is set to be smaller than the disposition angle θ of the mount fastening screws 113. Thus, as described above, the rotation angle of the grip 11 in relation to the main body 2 of the imaging device may be roughly adjusted by rotating the fixed angle of the lens barrel 10 in relation to the mount 112B, and the rotation angle of the grip 11 in relation to the main body 2 of the imaging device may be finely adjusted by placing the insertion holes 115, into which the mount fastening screws 113 are inserted, to be sequentially deviated from each other. Such a configuration allows the position of the grip 11 to be more appropriately adjusted depending on the individual difference of an operator, such as a build or a taste, or a photographing condition so that the burden on the operator can be further reduced.

As described above, the present specification discloses the following items.

(1) It is a lens device, comprising: a lens barrel configured to accommodate an image-formation optical system including at least one movable optical element, the lens barrel including an operation ring provided to be rotatable about an optical axis of the image-formation optical system to adjust the movable optical element; a drive unit including a drive part configured to rotatably drive the operation ring, the drive unit being detachably fixed to a predetermined portion on an outer circumference of the lens barrel, in which the drive unit moves in relation to the lens barrel in a direction of the optical axis to be attached to or detached from the lens barrel, and the operation ring and the drive unit are respectively provided with engaging parts, in which, when the operation ring is at a predetermined rotation angle about the optical axis, the engaging parts being configured to be engaged with each other during the attachment or detachment of the drive unit in relation to the lens barrel to allow the attachment or detachment of the drive unit.

(2) It is the lens device of (1), in which the image-formation optical system includes a plurality of movable optical elements, a plurality of operation rings is provided to correspond to the plurality of movable optical elements, respectively, and the engaging part of each of the operation rings is aligned in the direction of the optical axis when each of the operation rings is at the predetermined rotation angle.

(3) It is the lens device of (1) or (2), in which one of the engaging part of the operation ring and the engaging part of the drive unit is a groove extending along the optical axis, and the other of the engaging parts is a protrusion passing through the groove in the direction of the optical axis according to a relative movement of the drive unit and the lens barrel in the direction of the optical axis.

(4) It is the lens device of (3), in which, among opposite end parts of the groove in the direction of the optical axis, an end part which is provided on an entrance side for the protrusion has a tapered shape that is gradually widened toward a corresponding end of the groove when the drive unit is mounted to the lens barrel.

(5) It is the lens device of (4), in which each of the opposite end parts of the groove in the direction of the optical axis has the tapered shape that is gradually widened toward the corresponding end of the groove.

(6) It is the lens device of any one of (1) to (5), in which the lens barrel and the drive unit are respectively provided with guide parts that are engaged with each other to guide a movement of the drive unit in the direction of the optical axis.

(7) It is the lens device of (6), further comprising: an annular fixture configured to wrap the outer circumference of the lens barrel to fix the drive unit to the lens barrel, in which the lens barrel is inserted into or pulled out of the fixture so that the drive unit is attached to or detached from the lens barrel.

(8) It is the lens device of (7), in which an engaging part is provided on the outer circumference of the lens barrel, the engaging part being configured to be engaged with the engaging part of the drive unit while the drive unit is being attached to or detached from the lens barrel and in a state where the drive unit is attached to the lens.

(9) It is the lens device of any one of (1) to (8), further comprising: a mount provided on a base portion of the lens barrel to secure the lens device to a main body of an imaging apparatus, in which the lens barrel rotates about the optical axis at a predetermined angular interval in relation to the mount to be fixed to the mount.

(10) It is the lens device of (9), in which the mount is fastened to the base portion of the lens barrel via a plurality of fastening screws, and the plurality of fastening screws is arranged at a same radius from the optical axis and at an interval of a first predetermined angle.

(11) It is the lens device of (10), in which a plurality of insertion holes is formed in each fastening area on the mount, the fastening screws being inserted through the insertion holes, and the plurality of insertion holes are arranged at a same radius from the optical axis and at an interval of a second predetermined angle that is smaller than the first predetermined angle.

(12) It is an imaging apparatus having the lens device of any one of (1) to (11).

According to the present invention, it is possible to provide a lens device, which allows a rotation angle of an operation ring in relation to a drive unit to be appropriately adjusted through a simple configuration, thus facilitating the attachment or detachment of the drive unit.

While the present invention has been described with reference to specific exemplary embodiments in detail, it is apparent to those skilled in the art that various changes or modifications may be made without departing from the spirit and scope of the present invention.

This application is based on Japanese Patent Application No. 2012-019051 filed on Jan. 31, 2012, and the contents of which are incorporated herein by reference.

What is claimed is:

1. A lens device, comprising:
a lens barrel configured to accommodate an image-formation optical system including at least one movable optical element, the lens barrel including an operation ring provided to be rotatable about an optical axis of the image-formation optical system to adjust the movable optical element; and
a drive unit including a drive part configured to rotatably drive the operation ring, the drive unit being detachably fixed to a predetermined portion on an outer circumference of the lens barrel,
wherein: the drive unit moves in relation to the lens barrel in a direction of the optical axis to be attached to or detached from the lens barrel,
the operation ring and the drive unit are respectively provided with engaging parts, wherein, when the operation ring is at a predetermined rotation angle about the optical axis, the engaging parts being configured to be engaged with each other during the attachment or detachment of the drive unit in relation to the lens barrel to allow the attachment or detachment of the drive unit,
the image-formation optical system includes a plurality of movable optical elements,
a plurality of operation rings is provided to correspond to the plurality of movable optical elements, respectively, and
the engaging part of each of the operation rings is aligned in the direction of the optical axis when each of the operation rings is at the predetermined rotation angle.

2. The lens device of claim 1, wherein the lens barrel and the drive unit are respectively provided with guide parts that are engaged with each other to guide a movement of the drive unit in the direction of the optical axis.

3. The lens device of claim 1, further comprising:
a mount provided on a base portion of the lens barrel to secure the lens device to a main body of an imaging apparatus,
wherein the lens barrel rotates about the optical axis at a predetermined angular interval in relation to the mount to be fixed to the mount.

4. The lens device of claim 3, wherein the mount is fastened to the base portion of the lens barrel via a plurality of fastening screws, and
the plurality of fastening screws is arranged at a same radius from the optical axis and at an interval of a first predetermined angle.

5. The lens device of claim 4, wherein a plurality of insertion holes is formed in each fastening area on the mount, the fastening screws being inserted through the insertion holes, and
the plurality of insertion holes is arranged at a same radius from the optical axis and at an interval of a second predetermined angle that is smaller than the first predetermined angle.

6. An imaging apparatus having the lens device of claim 1.

7. A lens device, comprising:
a lens barrel configured to accommodate an image-formation optical system including at least one movable optical element, the lens barrel including an operation ring provided to be rotatable about an optical axis of the image-formation optical system to adjust the movable optical element; and
a drive unit including a drive part configured to rotatably drive the operation ring, the drive unit being detachably fixed to a predetermined portion on an outer circumference of the lens barrel,
wherein: the drive unit moves in relation to the lens barrel in a direction of the optical axis to be attached to or detached from the lens barrel,
the operation ring and the drive unit are respectively provided with engaging parts, wherein, when the operation ring is at a predetermined rotation angle about the optical axis, the engaging parts being configured to be engaged with each other during the attachment or detachment of the drive unit in relation to the lens barrel to allow the attachment or detachment of the drive unit, and
one of the engaging part of the operation ring and the engaging part of the drive unit is a groove extending along the optical axis, and the other of the engaging parts is a protrusion passing through the groove in the direction of the optical axis according to a relative movement of the drive unit and the lens barrel in the direction of the optical axis.

8. The lens device of claim 7, wherein, among opposite end parts of the groove in the direction of the optical axis, an end part which is provided on an entrance side for the protrusion has a tapered shape that is gradually widened toward a corresponding end of the groove when the drive unit is mounted to the lens barrel.

9. The lens device of claim 8, wherein each of the opposite end parts of the groove in the direction of the optical axis has the tapered shape that is gradually widened toward the corresponding end of the groove.

10. A lens device, comprising:
a lens barrel configured to accommodate an image-formation optical system including at least one movable optical element, the lens barrel including an operation ring provided to be rotatable about an optical axis of the image-formation optical system to adjust the movable optical element;
a drive unit including a drive part configured to rotatably drive the operation ring, the drive unit being detachably fixed to a predetermined portion on an outer circumference of the lens barrel; and
an annular fixture configured to wrap the outer circumference of the lens barrel to fix the drive unit to the lens barrel,
wherein: the drive unit moves in relation to the lens barrel in a direction of the optical axis to be attached to or detached from the lens barrel,
the operation ring and the drive unit are respectively provided with engaging parts, wherein, when the operation ring is at a predetermined rotation angle about the optical axis, the engaging parts being configured to be engaged with each other during the attachment or detachment of the drive unit in relation to the lens barrel to allow the attachment or detachment of the drive unit,
the lens barrel and the drive unit are respectively provided with guide parts that are engaged with each other to guide a movement of the drive unit in the direction of the optical axis, and
the lens barrel is inserted into or pulled out of the fixture so that the drive unit is attached to or detached from the lens barrel.

11. The lens device of claim 10, wherein an engaging part is provided on the outer circumference of the lens barrel, the engaging part being configured to be engaged with the engaging part of the drive unit while the drive unit is being attached to or detached from the lens barrel and in a state where the drive unit is attached to the lens barrel.

\* \* \* \* \*